(No Model.)
J. J. LARIMER.
DITCHING PLOW.
No. 507,913. Patented Oct. 31, 1893.
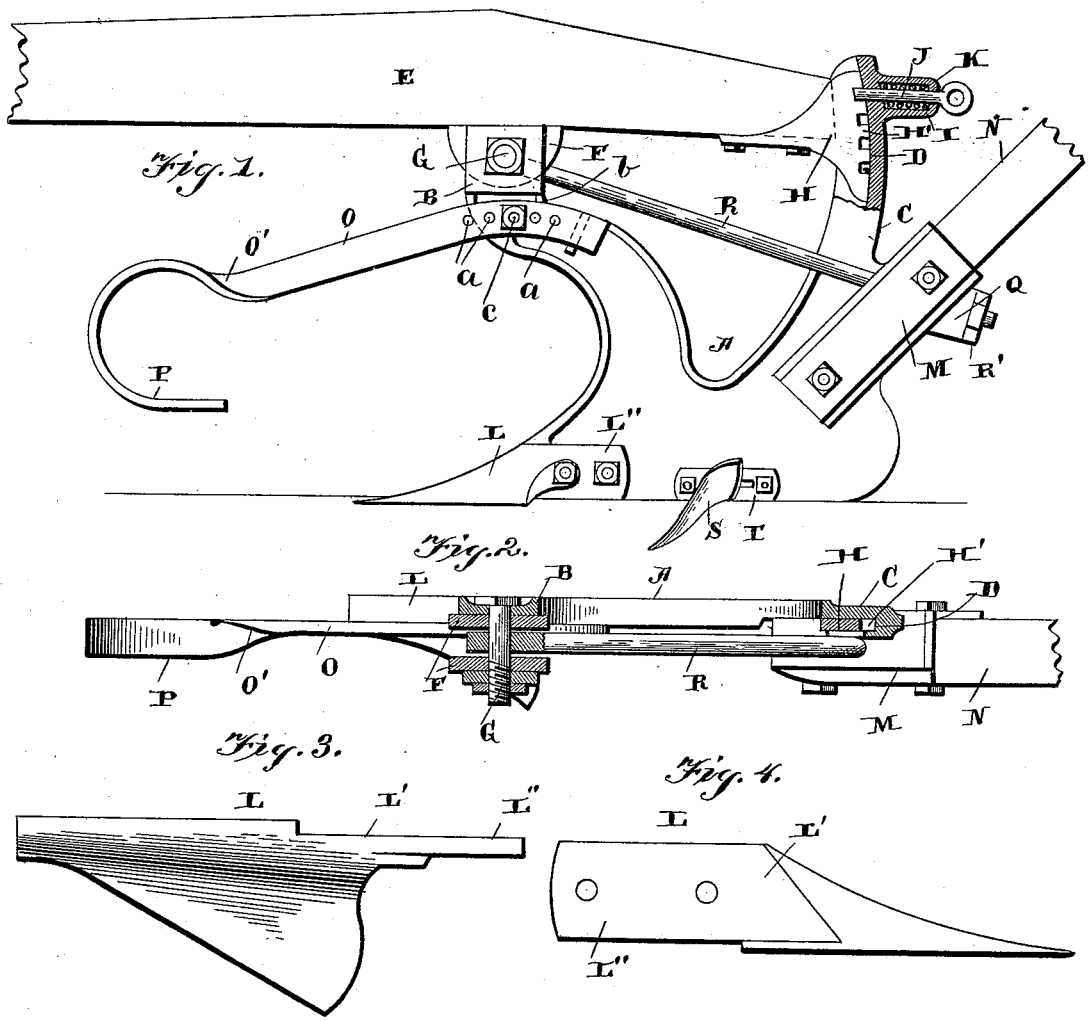
Witnesses
Geo. E. Frech.
Roland A. Fitzgerald.
Inventor
John J. Larimer
By Lehmann Pattison & Nesbit
Attys

UNITED STATES PATENT OFFICE.

JOHN J. LARIMER, OF CRAB TREE, PENNSYLVANIA.

DITCHING-PLOW.

SPECIFICATION forming part of Letters Patent No. 507,913, dated October 31, 1893.

Application filed March 29, 1893. Serial No. 468,108. (No model.)

*To all whom it may concern:*

Be it known that I, JOHN J. LARIMER, of Crab Tree, in the county of Westmoreland and State of Pennsylvania, have invented certain new and useful Improvements in Ditching-Plows; and I do hereby declare the following to be a full, clear, and exact description of the invention, such as will enable others skilled in the art to which it pertains to make and use it, reference being had to the accompanying drawings, which form part of this specification.

My invention relates to an improvement in ditching plows, and it consists in the novel adjustment of the beam; in the improved gage; and further in the novel device which I arrange for forming a tile receiving channel, all of which will be more fully described hereinafter and especially referred to in the annexed claims.

The object of my invention is to provide an improved implement for loosening the earth in the line of a proposed ditch, and it is more especially adapted for the formation of those ditches which are used for the reception of underground drains.

Referring to the accompanying drawings:—Figure 1, is a side elevation of my improved plow. Fig. 2, is a plan view shown partly in section. Figs. 3 and 4, are detached views of the share.

A indicates the land side or stock having the projection B at its forward end and the vertical extension C at its rear end, having formed therein the curved groove D.

E designates the beam which is preferably about double the length of an ordinary plow beam having upon its lower side the fulcrum block F, which is pivotally connected to the upper end of projection B by pin G, as shown, thus affording the beam a vertically swinging movement.

Secured to and extending rearward from the end of beam E is the segmental rack H which extends into and is adapted to move in groove D of extension C. Extending outward from the extension C is the angular open frame I and projecting transversely therethrough and through the extension C into the groove D is the bolt or pin J, which is held normally extended inward by the coiled spring K confined within the frame I, as shown. The inner end of this bolt is adapted to engage the notches H' of the rack H, and in this manner the beam may be adjusted to and held at the desired angle.

I employ no mold board but secure to the forward end of land side A, the share L which is provided with the lateral recess L' into which the forward end of land side A fits. The rear end L'' of share L bears flatly against the land side and is secured thereto by bolts, as shown, so that the share is held in place in a most secure manner without the use of a share bed common to plows now in general use. An inclined recessed lug M made integral with land side A forms a supporting socket for handle N, as shown.

For regulating the depth at which the plow shall run I provide the bar O which is twisted at O' and bent to form the slider P at its forward end. The rear end of the bar is preferably curved and provided with a series of bolt openings $a$, through which projects the adjusting bolt $c$. The upper edge of the rear end of the bar bears against the shoulder $b$, as shown, so that in adjusting the gage vertically its outer end is either raised or lowered in the arc of a circle concentric with the point at which it is secured to the plow. As the gage rests squarely against shoulder $b$, it cannot turn on its securing bolt and for this reason a most accurate and positive adjustment of the same is made possible.

In operation the line of the proposed ditch is first opened with an ordinary plow, and in the furrow thus formed is run my improved ditching plow which loosens up the earth, so that the same may be readily shoveled out. My plow may be run back and forth in the furrow several times if so desired before shoveling the earth out, and after each shoveling operation the earth may be loosened by running the plow therethrough.

It is evident that as the ditch deepens the forward end of the plow beam may be elevated by my improved adjustment, and thus the same may be made to run at the desired angle.

Owing to the peculiar construction of the plow it is apparent that all the draft will be brought upon the projection B of the land side A, and in order to strengthen this projection or rather relieve it of some of the draft, I provide the rearwardly extending rod R, which at its forward end is connected to the pivotal bolt and at its opposite end is extended through the socket Q, and securely fastened by a nut R', as shown. Thus it will be seen that considerable amount of the strain will be transferred to the rear portion of the land side, and thus the extension B, relieved of a material part of the strain.

My improved plow is well adapted for use in assisting the formation of ditches for the reception of drain tiles and when the ditch has been deepened to the required depth, I attach to the bottom of the land side the depending spoon shaped tongue or share S, which is secured to the said land side by means of the strap T, as shown. This attachment is for the purpose of forming a channel or depression in the bottom of the ditch for the reception of the tiles whereby they are held in the desired position until the earth is filled into the ditch proper. Much inconvenience is experienced in tile draining owing to the fact that tiles frequently become displaced before the ground is filled in upon them, and this last described attachment is provided expressly to do away with that difficulty.

Having thus fully described my invention, what I claim, and desire to secure by Letters Patent, is—

1. An improved plow comprising a stock and a channeling tongue detachably secured to the vertical side of the stock and depending beneath the same, substantially as shown and described.

2. An improved plow comprising a stock, grooved vertical extension C thereon, a beam fulcrumed between its ends to the stock, a rack secured to the rear end of the beam which is adapted to move in the said grooved extension, and a means for holding the said rack therein in different vertical positions, substantially as shown and described.

3. An improved plow comprising a stock, a beam fulcrumed thereto between its ends, frame I extending laterally from the stock, a locking pin extending longitudinally therethrough and adapted to engage the inner end of the beam, and a spring in the said frame for holding the said pin normally pushed inward, substantially as shown and described.

4. The combination with a plow, of a gage extended therefrom, a series of securing points arranged in the segment of a circle on the end of the gage adjacent the plow, and a means of securing the same thereto, substantially as shown and described.

In testimony whereof I affix my signature in presence of two witnesses.

JOHN J. LARIMER.

Witnesses:
J. McKINNEY,
S. COHEN.